(12) United States Patent
Basu et al.

(10) Patent No.: US 7,215,731 B1
(45) Date of Patent: May 8, 2007

(54) FAST BACKPROJECTION/REPROJECTION WITH HEXAGONAL SEGMENTATION OF IMAGE

(75) Inventors: Samit Kumar Basu, Niskayuna, NY (US); Bruno Kristiaan Bernard DeMan, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 11/164,625

(22) Filed: Nov. 30, 2005

(51) Int. Cl.
*A61B 6/03* (2006.01)

(52) U.S. Cl. ............................ 378/4; 382/131; 378/901
(58) Field of Classification Search ............... 378/4, 378/15, 901; 382/128, 131
See application file for complete search history.

(56) References Cited

U.S. PATENT DOCUMENTS

| 6,282,257 | B1 | 8/2001 | Basu et al. |
| 6,292,578 | B1 * | 9/2001 | Kalvin ................ 382/131 |
| 6,307,911 | B1 | 10/2001 | Basu et al. |
| 6,332,035 | B1 | 12/2001 | Basu et al. |
| 6,351,548 | B1 | 2/2002 | Basu et al. |
| 2003/0161443 | A1 * | 8/2003 | Xiao et al. ................ 378/210 |

* cited by examiner

*Primary Examiner*—Akm E. Ullah
*Assistant Examiner*—Anthony K. Cohran
(74) *Attorney, Agent, or Firm*—William E. Powell, III; Curtis B. Brueske

(57) ABSTRACT

A reprojection/backprojection technique and apparatus for carrying out such a technique provides a hierarchical solution to speeding-up reprojection and backprojection of tomographic images. In the context of reprojection, a tomographic image is divided into a series of subimages. Each subimage is shifted to the origin, projected at a reduced number of views, and then up-sampled and shifted back (in the sinogram space). The resulting sinograms are then combined to provide a single sinogram. This process is applied one or more times recursively. In the context of backprojection, the above steps are transposed such that a sinogram is divided into a series of subsinograms. The subsinograms are then shifted and decimated by a given decimation factor. The decimated subsinograms are then backprojected onto hexagonal tiles whereupon the tiles are composited into a final image.

20 Claims, 5 Drawing Sheets

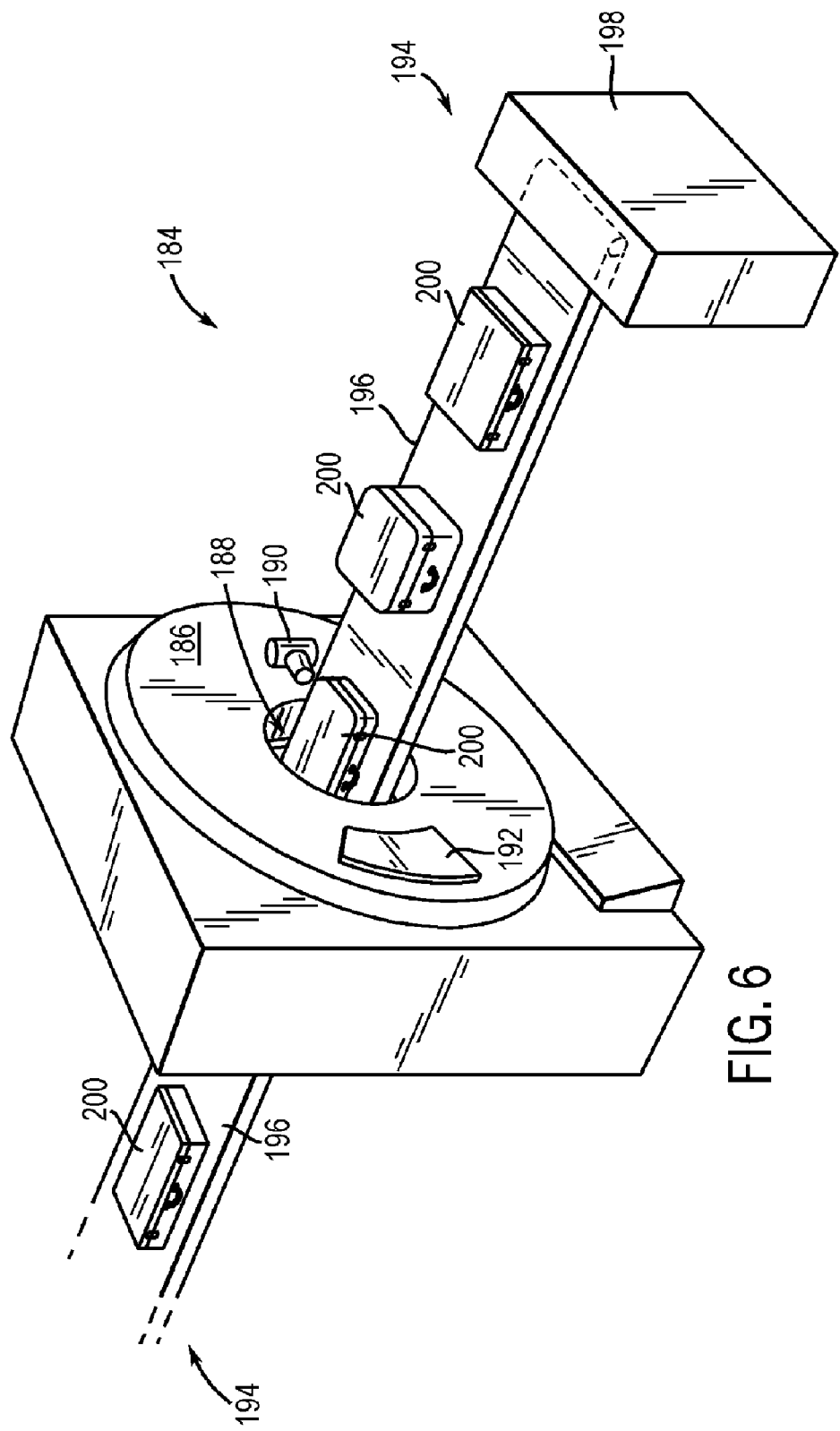

FAST BACKPROJECTION/REPROJECTION WITH HEXAGONAL SEGMENTATION OF IMAGE

BACKGROUND OF THE INVENTION

The present invention relates generally to tomographic imaging and, more particularly, to reprojection and backprojection of tomographic images with hexagonal segmentation. The invention is applicable with tomographic imaging systems such as those used for medical imaging as well as those used for package/baggage security screening systems, non-destructive evaluation, or any other application domain requiring projection or backprojection.

A number of imaging modalities, such as computed tomography (CT), positron emission tomography (PET), single photon counting tomography (SPECT), electrical impedance tomography (EIT), optical tomography, and certain acquisition methods for magnetic resonance imaging (MRI) utilize tomographic reconstruction techniques. Generally, in tomographic reconstruction, tomographic images are created from line or plane integral measurements of an object at a number of orientations. These integral measurements are then processed to yield an image of the object. Projection data is collected into a sinogram that is processed and backprojected to yield the image. Customarily, the projection data undergoes a filtering step prior to backprojection to remove blurring in the image that typically results from a simple backprojection. This reconstruction method is called filtered backprojection (FBP). Other reconstruction techniques of interest include but are not limited to iterative reconstruction algorithms such as maximum likelihood approaches or weighted least square approaches. Furthermore, the proposed technique is also useful for simulations and for certain iterative correction algorithms.

Developments in special hardware that exploits the parallelism of the backprojection process have led to reductions in the reconstruction time of tomographic images. However, notwithstanding these developments, the backprojection process has limited the ability to provide near real-time reconstruction of images. As tomographic scanners are being designed to acquire the raw data at an increasingly faster rate, the computational requirements of conventional FBP becomes increasingly problematic and, as such, presents an obstacle to real-time imaging. More importantly, for iterative reconstruction—which is already routinely used in emission tomography today—the computational requirements are one or two orders of magnitude higher than for FBP.

In this regard, streamlining the projection and backprojection process (PBP) is increasingly garnering the efforts of researchers and engineers. As such, a number of relatively fast reconstruction algorithms have been developed to reduce reconstruction time. In conventional backprojection (or equivalently reprojection), the required number of operations is proportional to $N^3$ for a single 2D image with NxN square pixels and N views. For some fast backprojection techniques, the order of magnitude of the number of operations for a single 2D image with NxN pixels and N views has been reduced to $N^2 \log_2 N$. However, while the PBP process has been quickened, image quality and/or image accuracy has degraded. In one proposed PBP technique, a sinogram is recursively subdivided into a series of subsinograms with each subsinogram corresponding to a single pixel (or relatively small number of pixels) of a pixelated image. A pixel is conventionally understood to be a square picture element. While this proposed PBP technique reduces image reconstruction time, e.g., by a factor of $N^2 \log_2 N$, the square pixels that the subsinograms represent result in less than ideal coverage of a circular field-of-view (FOV). So the existing fast algorithms are also sub-optimal in this sense. Furthermore, as is appreciated by those skilled in the art, square pixel grids do not provide the optimal sampling in the frequency domain for images, which tend to have a spherical support. This suboptimal sampling can also reduce image quality.

Therefore, it would be desirable to design an apparatus and method of fast PBP that provide further reductions in reconstruction time or that result in improved image quality, and that better covers a circular field of view.

BRIEF DESCRIPTION OF THE INVENTION

The invention is directed to a method and apparatus for reprojection/backprojection that overcomes the aforementioned drawbacks.

A reprojection/backprojection technique and apparatus for carrying out such a technique are disclosed. The technique provides a hierarchical solution to speeding-up reprojection and backprojection of tomographic images. In the context of reprojection, a tomographic image is divided into a series of hexagonal tiles. The image is divided into a series of subimages with each hexagonal subimage also tiled with hexagonal tiles. Each subimage is shifted to the origin, projected at a reduced number of views, interpolated to a larger number of projection angles via up-sampling, and then shifted back in the sinogram space (which corresponds to a view-by-view translation in the sinogram space). The resulting sinograms are then combined to provide a single sinogram. In the context of backprojection, the above steps are transposed such that a sinogram is divided into a series of subsinograms. Those subsinograms are then shifted view-by-view, smoothed and decimated by a given decimation factor. The decimated subsinograms are then backprojected onto hexagonal tiles, whereupon the tiles are composited into a final image. In a preferred embodiment, a 2.65 decrease (per stage in the hierarchy) in reprojection/reconstruction processing time for an image of size NxN and a sinogram with N views is provided. By recursively applying the same technique a speedup of $2.65^n$ is achieved where $n = \log_{2.65} N$. That is, the backprojection is performed recursively, with each of the hexagonal image tiles being partitioned into smaller hexagonal tiles. Accordingly, a factor of 2.65 decrease in processing time is obtained with each recursion of the decomposition. It is recognized that it may not be possible to decrease the number of views by 2.65, as the number of projections are constrained to be integers, thus, in one embodiment, a larger or smaller integer number of views is chosen so as to approximate the desired factor of 2.65 reduction.

According to one aspect of the invention, a tomographic imaging apparatus having a scanner for acquiring tomographic data of an object and a computer programmed to generate a sinogram from tomographic data acquired by the scanner are included. The computer is also programmed to segment the sinogram into a plurality of subsinograms and backproject each of the subsinograms onto a respective hexagonal tile. The computer then combines the hexagonal tiles to form a composite image of the object.

In accordance with another aspect of the invention, a process of reconstructing a tomographic image is presented. The process includes the steps of subdividing a sinogram into a series of subsinograms and backprojecting each of the subsinograms onto a respective hexagonal tile. The process continues with the combining of the hexagonal tiles to form an electronic image.

According to another aspect of the invention, a computer program stored on a computer readable storage medium is provided such that when executed by a computer it causes the computer to divide a tomographic image into a plurality of subimages and generate a subsinogram for each subimage. Each subsinogram corresponds to N/2.65 views. The computer is further caused to up-sample each subsinogram such that each subsinogram corresponds to N views and combine the upsampled subsinograms to form a sinogram.

Various other features and advantages of embodiments of the invention will be made apparent from the following detailed description and the drawings.

BRIEF DESCRIPTION OF THE DRAWINGS

FIG. 6 is a pictorial view of a CT system for use with a non-invasive package/baggage inspection system according to an embodiment of the invention.

DETAILED DESCRIPTION OF PREFERRED EMBODIMENTS

While embodiments of the invention are applicable to a number of tomographic systems, the operating environment of embodiments of the invention described herein will be described with respect to a CT system. While a "third generation" CT scanner will be particularly described, the invention is not so limited. Moreover, it is understood that the invention is also applicable with PET, MRI, SPECT, EIT, and optical tomography systems.

Figure 1:
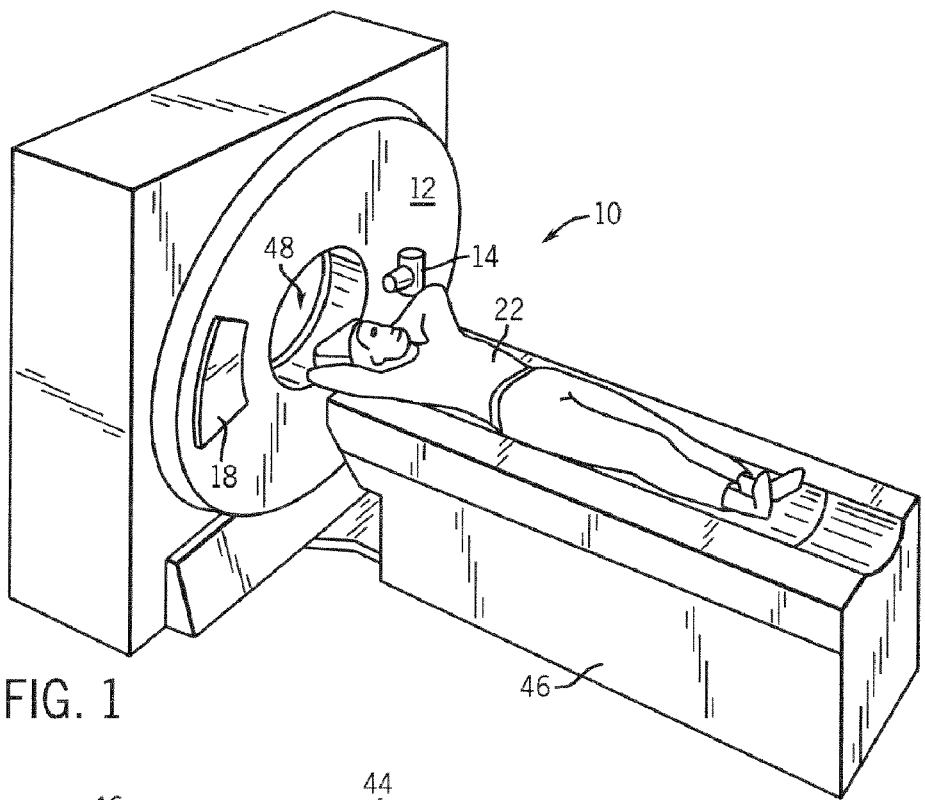
FIG. 1 is a pictorial view of a CT imaging system.
Figure 2:
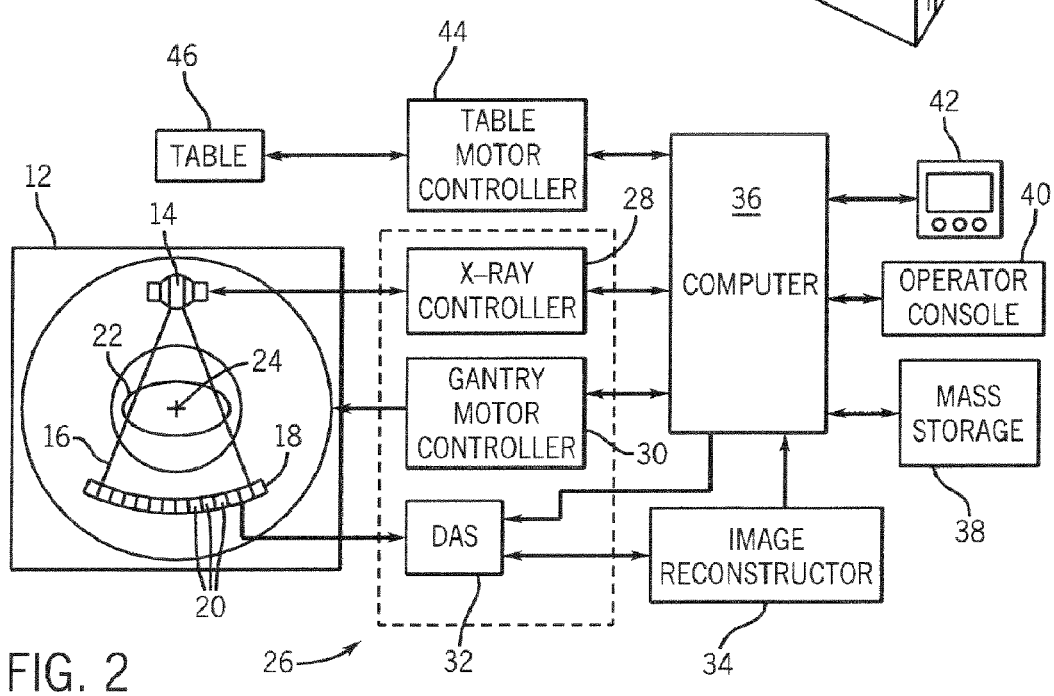
FIG. 2 is a block schematic diagram of the system illustrated in FIG. 1.

Referring to FIGS. 1 and 2, a computed tomography (CT) imaging system 10 is shown as including a gantry 12 representative of a "third generation" CT scanner. Gantry 12 has an x-ray source 14 that projects a beam of x-rays 16 toward a detector array 18 on the opposite side of the gantry 12. Detector array 18 is formed by a plurality of detectors 20 which together sense the projected x-rays that pass through a medical patient 22. Each detector 20 produces an electrical signal that represents the intensity of an impinging x-ray beam and hence the attenuated beam as it passes through the patient 22. During a scan to acquire x-ray projection data, gantry 12 and the components mounted thereon rotate about a center of rotation 24. While the CT imaging system 10 is shown in reference to a medical patient 22, it should be appreciated that such an imaging system 10 may have applications outside of the medical realm. For example, the CT imaging system 10 may be utilized in a luggage screening capacity, ascertaining the contents of closed articles, such as luggage, packages, etc., in search of contraband such as explosives or biohazardous materials.

Rotation of gantry 12 and the operation of x-ray source 14 are governed by a control mechanism 26 of CT system 10. Control mechanism 26 includes an x-ray controller 28 that provides power and timing signals to an x-ray source 14 and a gantry motor controller 30 that controls the rotational speed and position of gantry 12. A data acquisition system (DAS) 32 in control mechanism 26 samples analog data from detectors 20 and converts the data to digital signals for subsequent processing. An image reconstructor 34 receives sampled and digitized x-ray data from DAS 32 and performs high speed reconstruction. The reconstructed image is applied as an input to a computer 36 which stores the image in a mass storage device 38.

Computer 36 also receives commands and scanning parameters from an operator via console 40 that has a keyboard. An associated cathode ray tube display 42 allows the operator to observe the reconstructed image and other data from computer 36. The operator supplied commands and parameters are used by computer 36 to provide control signals and information to DAS 32, x-ray controller 28 and gantry motor controller 30. In addition, computer 36 operates a table motor controller 44 which controls a motorized table 46 to position patient 22 and gantry 12. Particularly, table 46 moves portions of patient 22 through a gantry opening 48.

Embodiments of the invention are directed to a backprojection/reprojection technique that can be carried out on a variety of tomography systems, such as the CT system illustrated in FIGS. 1–2. As described, the imaging apparatus acquires data from an object and sends the acquired raw data to a receiver. The data is processed in a post-processor, which performs a variety of post-processing functions, such as re-binning and filtering. The output of the post-processor is a sinogram that is then backprojected to reconstruct an image that can be displayed. It is contemplated that the backprojection and reprojection techniques can be embodied in computer executable code that can be executed by computer 36 or other processor.

A sinogram is an image of the raw data acquired for a number of given views with a tomography system. In this regard, conventionally, the horizontal axis of the sinogram corresponds to the data acquired at one instant in time along the length of the detector array. The vertical axis corresponds to each projection angle at which data was acquired for the given view. Thus, for a tomography scanner that acquires data for a view at 1000 projection angles and 800 x-rays at each projection angle, the resulting sinogram will have 800K data points. Generally, the greater the number of data points, the better the image quality for that view. While the present invention is described primary for a parallel-beam geometry, extensions to fan-beam and cone-beam geometries are contemplated.

As described above, to reconstruct an image from a sinogram, the data of the sinogram undergoes at least one backprojection step. According to embodiments of the invention, a hierarchical backprojection (HBP) is carried out with the sinogram being decomposed into a series of subsinograms that each correspond to a hexagonal tile of a resulting image. This HBP technique is illustrated schematically in FIG. 3.

Figure 3:
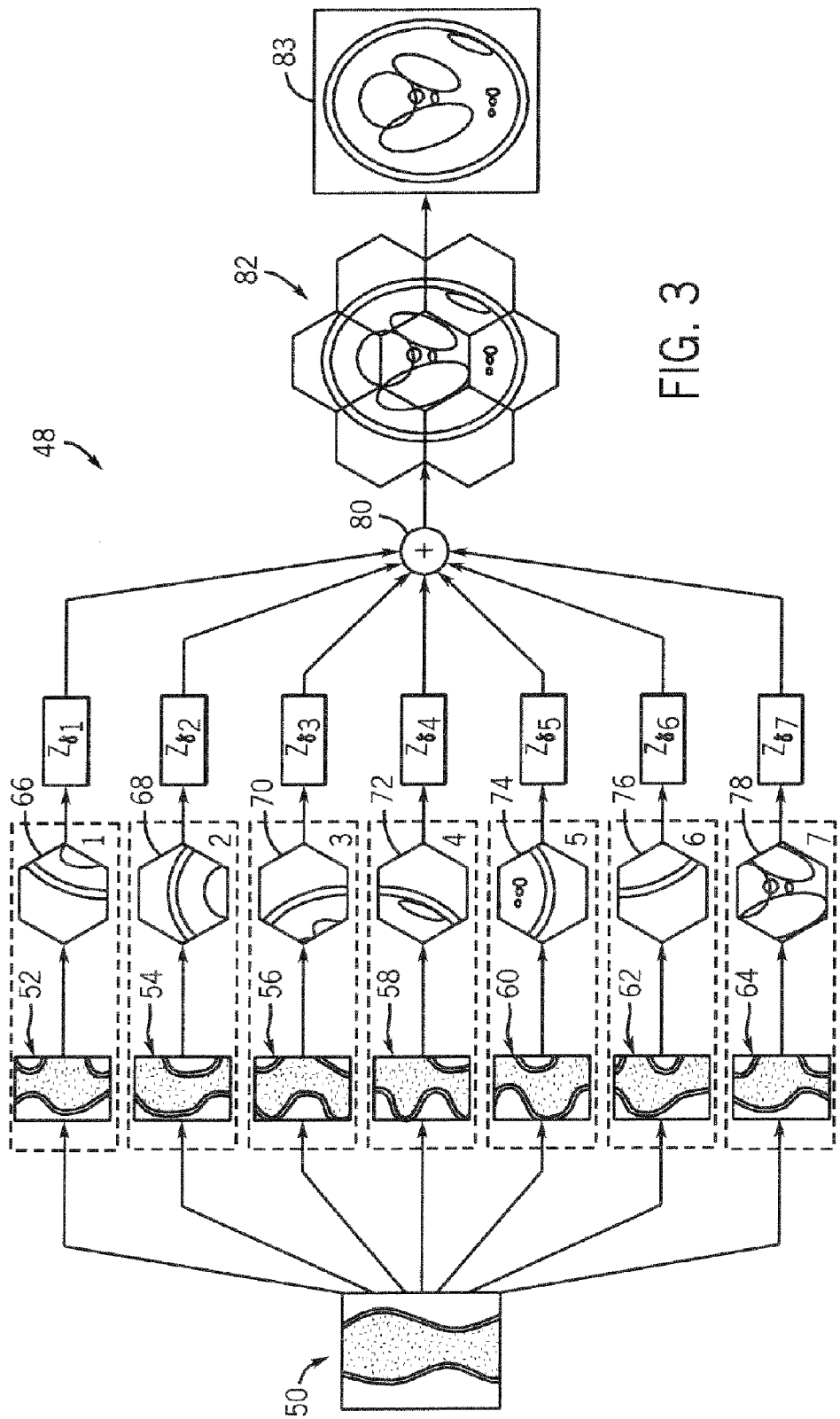
FIG. 3 is a diagram illustrating steps of backprojection according to an embodiment of the invention.

The HBP technique 48 begins with a sinogram 50. The sinogram includes any two-dimensional array of numerical values in which one index is radial and the other index is angular. For three-dimensional geometries there is a third index which is longitudinal. For example, the sinogram may correspond to a collection of projections, a collection of radially filtered projections, a collection of synthetic-aperture-radar (SAR) data that has been radially-inverse-Fourier transformed, and the like. In a conventional manner, the sinogram 50 is shifted and truncated into a series of subsinograms 52, 54, 56, 58, 60, 62, and 64. In a preferred embodiment, the sinogram is truncated into seven subsinograms; however, it is contemplated that the sinogram may be divided into fewer or more than seven subsinograms. Each subsinogram 52–64 is subdivided (decimated) and each of those subdivided subsinograms are further subdivided into seven subsinograms, for example, until each subsinogram represents a single image element. In a preferred embodiment, each subsinogram is decimated by a decimation factor of 2.65; however, other decimation factor values are contemplated. The last subsinograms are then backprojected to create subimages. As illustrated in FIG. 3, the subsinograms are backprojected onto hexagonal tiles or subimages 66, 68, 70, 72, 74, 76, and 78. The subimages are then composited 80 into a final image 82. It is contemplated that the hexagonally-tiled image 82 can be resampled onto a square pixel grid for final presentation and/or analysis in a pixelated image 83.

By backprojecting the subsinograms onto hexagonal image tiles rather than conventional square pixels, a more efficient packing of a circular FOV and a greater decimation factor is realized. Regarding the latter, in conventional fast PBP techniques, a $N^2 \log 2N$ reduction in processing time is achieved for a 2D image with N×N pixels and N views. However, backprojection processing time can be reduced for the same 2D image by $N^2 \log_{2.65} N$. Thus, for an image with $1024^2$ elements (pixels), the present invention requires approximately 1/145 of the processing time of conventional PBP techniques. Relative to other fast PBP techniques, the present invention realizes a 30 percent reduction in processing time.

With regards to the former, a hexagonal tile is itself more circular than a square pixel or tile. Thus, the hexagonal tiles can be fit more compactly in an image of a circular FOV. In this regard, the hexagonal tiles provide a greater sampling density for a circular FOV compared to conventional fast PBP techniques. As a result, the sampling density in the projection domain necessary to characterize the tiles is lower, which yields a further reduction in processing time. Furthermore, as will be appreciated by those skilled in the art, hexagonal sampling of the image also results in optimal sampling of the images in the Fourier domain provided the images have spherical spectral support. This improved sampling results in effectively higher sampling densities and better image quality, or conversely, fewer samples to obtain the same image quality but with reduced computation.

Figure 4:
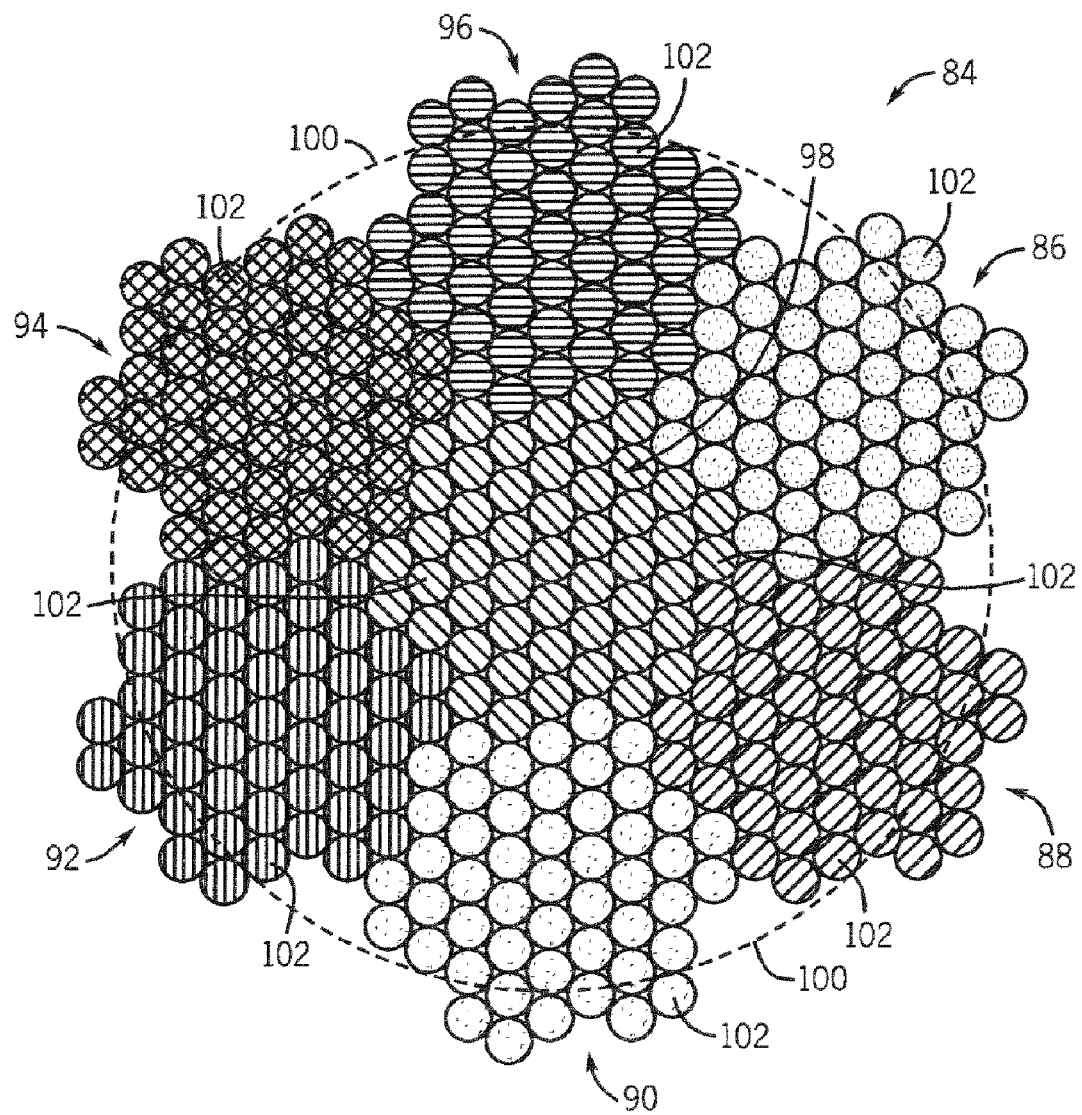
FIG. 4 is a schematic illustrating an electronic image comprised of seven hexagonal tiles.

Referring now to FIG. 4, an exemplary hexagonally-tiled electronic image 84 is shown as comprising seven hexagonal tiles 86, 88, 90, 92, 94, 96, and 98. The hexagonal tiles 86–98 are shown relative to a circular FOV 100. Thus, in the exemplary image, six of the tiles 86–96 are positioned around a center tile 98. As shown, the elementary hexagonal tiles 86–98 are not organized on a Cartesian grid but the rows of image elements 102 are alternately offset by half the sampling distance. While not required, this provides a denser sampling of the image 84.

Figure 5:
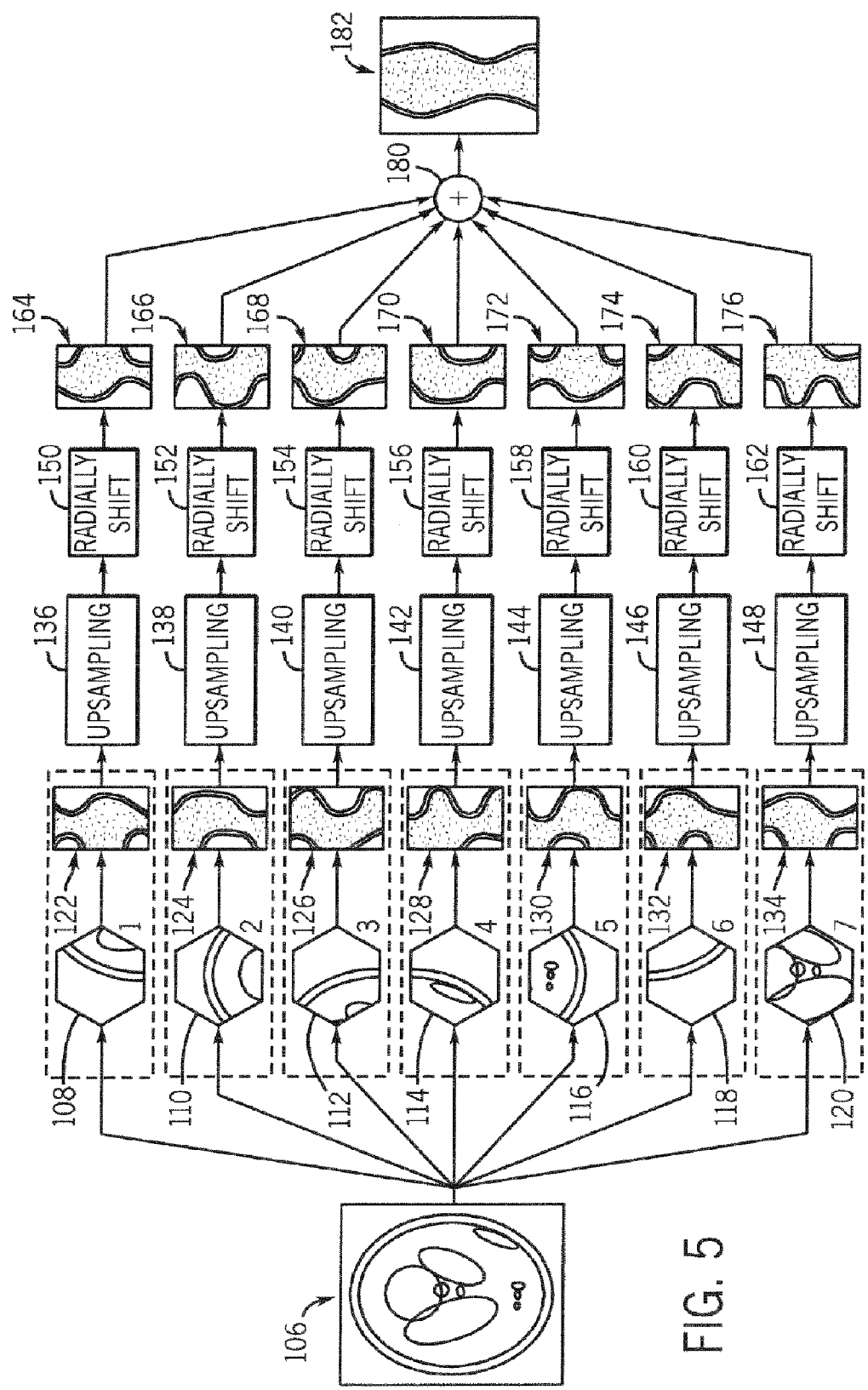
FIG. 5 is a diagram illustrating steps of reprojection according to an embodiment of the invention.

The principles described with reference to embodiments of the invention illustrated in FIGS. 1–4 may also be applied to a reprojection technique by transposing the backprojection technique described above. Such a reprojection technique is schematically illustrated in FIG. 5. With this reprojection technique 104, an N×N image 106 corresponding to N views is divided into a series of subimages 108, 110, 112, 114, 116, 118, and 120. Each subimage is preferably equally sized and is a hexagonal tile. Moreover, in a preferred embodiment, image 106 is initially divided into seven subimages; however, it is contemplated that fewer or more than seven subimages may be defined. Each subimage 108, 110, 112, 114, 116, 118, and 120 is shifted to the origin of the coordinate system followed by reprojection to yield a series of subsinograms 122, 124, 126, 128, 130, 132, and 134, respectively. In a preferred embodiment, each subsinogram 122, 124, 126, 128, 130, 132, and 134 corresponds to N/2.65 views (or some suitably chosen integer number of views in the case that N is not divisible by 2.65). The subsinograms 122, 124, 126, 128, 130, 132, and 134 are then upsampled at steps 136, 138, 140, 142, 144, 146, and 148, respectively, using interpolation to N views. The upsampled subsinograms are then radially shifted at steps 150, 152, 154, 156, 158, 160, and 162, respectively, so as to move each "tile" back to its original position. The radially shifted subsinograms 164, 166, 168, 170, 172, 174, and 176 are then combined at 180 to yield a composite sinogram 182. Relative to conventional fast reprojection algorithms, the technique of FIG. 5 provides a time savings of roughly 2.65.

The decomposition described with respect to FIG. 5 is applied recursively. That is, each of the subimages 108, 110, 112, 114, 116, 118 and 120 is processed in the same manner as image 106 until each subimage corresponds to one hexagonal image element of the image 106. By doing so, the time savings reduction corresponds to $N/\log_{2.65} N$.

Also, one skilled in the art will appreciate that in another embodiment of the invention, the interpolation step described above may be eliminated to increase overall accuracy by reprojecting at N views. While eliminating the interpolation step may add to the computational time of the reprojection process, any drawbacks associated therewith are mitigated by the increase in reprojection accuracy.

As described herein, a conventional square grid image has been assumed to comprises N×N pixels and the corresponding sinogram has N views. In this regard, N×N refers to the size of a square pixel grid that would have approximately the same size and sampling density as a hexagonally sampled image. It is contemplated however that the image on a hexagonal grid may comprise $7''$ pixels, where $7''$ approximately equals $\pi/(4N^2)$, where N is the number of views in the sinogram. However, the present invention is not so limited. That is, the hexagonally sampled image can correspond to a square pixel image of the size N×M and a corresponding number of views as L, without any constraint on N, M, or L.

As set forth above, it is contemplated that the invention may be applicable with non-CT imaging systems, such as a package/baggage inspection system. Referring now to FIG. 6, according to another embodiment of the invention, an exemplary package/baggage inspection system 184 includes a rotatable gantry 186 having an opening 188 therein through which packages or pieces of baggage may pass. The rotatable gantry 186 houses an x-ray source 190 as well as a detector assembly 192. A conveyor system 194 is also provided and includes a conveyor belt 196 supported by structure 198 to automatically and continuously pass packages or baggage pieces 200 through opening 188 to be scanned. Objects 200 are fed through opening 188 by conveyor belt 196, imaging data is then acquired, and the conveyor belt 196 removes the packages 200 from opening 188 in a controlled and continuous manner. As a result, postal inspectors, baggage handlers, and other security personnel may non-invasively inspect the contents of packages 200 for explosives, knives, guns, contraband, etc.

Therefore, embodiments of the invention include a tomographic imaging apparatus having a scanner for acquiring tomographic data of an object and a computer programmed to generate a sinogram from tomographic data acquired by the scanner. The computer is also programmed to segment the sinogram into a plurality of subsinograms and backproject each of the subsinograms onto a respective hexagonal tile. The computer then combines the hexagonal tiles to form a composite image of the object.

A process of reconstructing a tomographic image is also provided. The process includes the steps of subdividing a sinogram into a series of subsinograms and backprojecting each of the subsinograms onto a respective hexagonal tile. The process continues with the combining of the hexagonal tiles to form an electronic image.

Embodiments of the invention are also embodied in a computer program stored on a computer readable storage medium that when executed by a computer causes the computer to divide a tomographic image of N views into a plurality of subimages and generate a subsinogram for each subimage. Each subsinogram corresponds to N/2.65 views. The computer is further caused to upsample each subsinogram such that each subsinogram corresponds to N views and combine the upsampled subsinograms to form a sinogram.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A tomographic imaging apparatus, comprising:
   a scanner for acquiring tomographic data of an object; and
   a computer programmed to:
      generate a sinogram from tomographic data acquired by the scanner;
      segment the sinogram into a plurality of subsinograms;
      backproject each of the plurality of subsinograms onto a respective hexagonal tile; and
      combine the hexagonal tiles to form a composite image of the object.

2. The apparatus of claim 1, wherein the scanner is a CT scanner.

3. The apparatus of claim 1, wherein the computer is further programmed to segment the sinogram in a recursive manner until each subsinogram corresponds to an image that is one image element in size.

4. The apparatus of claim 1, wherein the computer is further programmed to segment the sinogram into seven subsinograms and backproject the seven subsinograms onto seven hexagonal tiles.

5. The apparatus of claim 1, wherein the computer is further programmed to:
   radially shift each subsinogram to a reference origin; and
   decimate each subsinogram by a given decimation factor.

6. The apparatus of claim 5, wherein the decimation factor is 2.65.

7. The apparatus of claim 1, wherein the computer is further programmed to resample the composite image having hexagonally-shaped image elements onto a square pixel grid to form a final image.

8. A process of reconstructing a tomographic image, comprising:
   subdividing a sinogram into a series of subsinograms;
   backprojecting each of the subsinograms onto a respective hexagonal tile;
   combining the hexagonal tiles to form an electronic image; and
   displaying the electronic image.

9. The process of claim 8, wherein the series of subsinograms includes seven sinograms.

10. The process of claim 9, wherein each subsinogram corresponds to a hexagonal image element of the electronic image.

11. The process of claim 8, wherein the series of subsinograms are generated from recursively subdividing the sinogram.

12. The process of claim 8, further comprising the step of acquiring raw data with a CT scanner and generating the sinogram from the raw data.

13. The process of claim 8, further comprising the step of decimating each subsinogram by a decimation factor.

14. The process of claim 13, wherein the decimation factor is 2.65.

15. The process of claim 8, wherein the step of backprojecting is carried out with $N^2 \log_{2.65} N$ operations, wherein N equals number of views of acquired data and where N×N approximates a number of samples in a corresponding square image.

16. A computer readable storage medium having a computer program stored thereon for image reprojection and representing a set of instructions that when executed by a computer causes the computer to:
   divide a tomographic image of $7^n$ samples into a plurality of subimages, each containing $7^{n-1}$ samples;
   generate a subsinogram for each subimage, each subsinogram corresponding to N/2.65 views;
   up-sample each subsinogram such that each subsinogram corresponds to N views; and
   combine the up-sampled subsinograms to form a sinogram.

17. The computer readable storage medium of claim 16, wherein the computer is further caused to perform the act of dividing in a recursive manner.

18. The computer readable storage medium of claim 16, wherein the computer is further caused to radially shift each upsampled subsinogram prior to the act of combining.

19. The computer readable storage medium of claim 16, wherein the computer is further caused to initially divide the tomographic image into seven subimages and recursively divide each of the seven subimages until each subimage corresponds to a single hexagonal tile.

20. The computer readable storage medium of claim 16 incorporated into a CT scanner.

* * * * *